United States Patent
Chen et al.

(10) Patent No.: US 10,211,750 B2
(45) Date of Patent: Feb. 19, 2019

(54) APPARATUS AND METHOD FOR LOW FREQUENCY POWER INVERTER

(71) Applicant: SCHNEIDER ELECTRIC IT CORPORATION, West Kingston, RI (US)

(72) Inventors: Hui-Jung Chen, New Taipei (TW); Chaocheng Yen, New Taipei (TW); Yen-Chih Hu, New Taipei (TW)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 245 days.

(21) Appl. No.: 15/042,444

(22) Filed: Feb. 12, 2016

(65) Prior Publication Data
US 2017/0237357 A1    Aug. 17, 2017

(51) Int. Cl.
*H02M 5/458* (2006.01)
*H02M 7/5387* (2007.01)
(Continued)

(52) U.S. Cl.
CPC ......... *H02M 5/458* (2013.01); *H02M 7/5387* (2013.01); *H02M 7/483* (2013.01); *H02M 2003/1557* (2013.01)

(58) Field of Classification Search
CPC .......... H02M 1/32; H02M 1/34; H02M 7/797; H02M 7/487
(Continued)

(56) References Cited

U.S. PATENT DOCUMENTS 5,504,414 A * 4/1996 Kinoshita ................ B60L 7/14
    180/65.8
5,657,220 A    8/1997 Yan
(Continued)

FOREIGN PATENT DOCUMENTS

| EP | 3089316 A1 | 11/2016 |
| WO | 03058590 A1 | 7/2003 |
| WO | 2015096613 A1 | 7/2015 |

OTHER PUBLICATIONS

Extended European Search Report from corresponding European Application No. 17155753.1 dated Jul. 7, 2017.
(Continued)

*Primary Examiner* — Harry Behm
*Assistant Examiner* — Lorena Bruner
(74) *Attorney, Agent, or Firm* — Lando & Anastasi, LLP

(57) ABSTRACT

According to one aspect, embodiments herein provide a DC-AC inverter comprising a DC-DC converter portion, an inverter portion, a clamp circuit, a controller configured to operate, in a first mode, the DC-DC converter portion to convert input DC power into DC power having a desired voltage level at a first polarity and the inverter portion to provide output power having the desired voltage level at the first polarity to the output, operate, in a second mode, the DC-DC converter portion to convert the input DC power into DC power having a desired voltage level at a second polarity and the inverter portion to provide output power having the desired voltage level at the second polarity to the output; and operate, in a third mode, the clamp circuit to drive voltage at the output to zero and to store energy discharged by a load capacitance in an energy storage device.

20 Claims, 17 Drawing Sheets

(51) Int. Cl.
*H02M 3/155* (2006.01)
*H02M 7/483* (2007.01)

(58) Field of Classification Search
USPC .................................................. 363/56.05
See application file for complete search history.

(56) References Cited

U.S. PATENT DOCUMENTS

| | | |
|---|---|---|
| 6,728,119 B2 | 4/2004 | Reilly et al. |
| 7,541,659 B1 | 6/2009 | Nam et al. |
| 2007/0081368 A1* | 4/2007 | Wai .................. H02M 1/34 363/98 |
| 2011/0249475 A1* | 10/2011 | Fujii .................. H02H 7/122 363/50 |
| 2012/0049772 A1* | 3/2012 | Moussaoui ......... H02M 3/1588 318/376 |

OTHER PUBLICATIONS

Adrian Ioinovici et al.: "SEPIC PWM Hard-switching Converter" In: "Power Electronics and Energy Conversion Systems, Fundamentals and Hard-switching Converters", Mar. 29, 2013 (Mar. 29, 2013), Wiley, XP055383190, ISBN: 978-1-118-44336-1, pp. 470-503.

* cited by examiner

| FIG. 3A | FIG. 3B |
|---|---|

APPARATUS AND METHOD FOR LOW FREQUENCY POWER INVERTER

BACKGROUND OF THE INVENTION

Field of the Invention

At least one example in accordance with the present invention relates generally to DC-AC power inverters.

Discussion of Related Art

The use of power devices, such as uninterruptible power supplies (UPS), to provide regulated, uninterrupted power for sensitive and/or critical loads, such as computer systems and other data processing systems, is known. Known uninterruptible power supplies include on-line UPS's, off-line UPS's, line interactive UPS's, as well as others. On-line UPS's provide conditioned AC power as well as back-up AC power upon interruption of a primary source of AC power. Off-line UPS's typically do not provide conditioning of input AC power, but do provide back-up AC power upon interruption of the primary AC power source. Line interactive UPS's are similar to off-line UPS's in that they switch to battery power when a blackout occurs but also typically include a multi-tap transformer for regulating the output voltage provided by the UPS.

A conventional online UPS rectifies input power provided by an electric utility using a Power Factor Correction circuit (PFC) to provide power to a DC bus. The rectified DC voltage is typically used to charge a battery while mains power is available, as well as to provide power to the DC bus. In the absence of mains power, the battery provides power to the DC bus. From the DC bus, a DC-AC inverter generates an AC output voltage to the load. Since the DC bus is powered either by mains or the battery, the output power of the UPS is uninterrupted if the mains fails and the battery is sufficiently charged. A conventional off-line UPS normally connects a load directly to utility power. When utility power is insufficient to power the load, the off-line UPS operates a DC-AC inverter to convert DC power from a backup power source (e.g., a battery) into desired AC power, which is provided to the load.

SUMMARY

Aspects in accord with the present invention are directed to a DC-AC inverter comprising an input configured to be coupled to a battery and to receive input DC power from the battery, a DC-DC converter portion coupled to the input and configured to receive the input DC power, an inverter portion coupled to the DC-DC converter portion, an output coupled to the inverter portion and configured to be coupled to a load, a clamp circuit coupled to the DC-DC converter portion, the clamp circuit including an energy storage device configured to be coupled to the load via the inverter portion, a controller coupled to the DC-DC converter portion, the clamp circuit, and the inverter portion, and configured to operate, in a first mode of operation, the DC-DC converter portion to convert the input DC power into DC power having a desired voltage level at a first polarity and the inverter portion to provide output power having the desired voltage level at the first polarity to the output, operate, in a second mode of operation, the DC-DC converter portion to convert the input DC power into DC power having a desired voltage level at a second polarity and the inverter portion to provide output power having the desired voltage level at the second polarity to the output; and operate, in a third mode of operation, the clamp circuit to drive voltage at the output to zero, to receive, via the inverter portion, energy discharged by a load capacitance at the load, and to store the energy discharged by the load capacitance in the energy storage device.

According to one embodiment, the DC-AC inverter further comprises a first bus coupled between the DC-DC converter portion and the inverter portion and configured to provide the DC power having the desired voltage level at the first polarity from the DC-DC converter portion to the inverter portion, and a second bus coupled between the DC-DC converter portion and the inverter portion and configured to provide the DC power having the desired voltage level at the second polarity from the DC-DC converter portion to the inverter portion. In one embodiment, the energy storage device of the clamp circuit is coupled to the first bus and the second bus, and the controller is further configured to operate, in the first mode of operation, the clamp circuit to discharge, via the first bus and the inverter portion, energy in the energy storage device to the load. In another embodiment, the controller is further configured to operate, in the second mode of operation, the clamp circuit to discharge, via the second bus and the inverter portion, energy in the energy storage device to the load.

According to another embodiment, the inverter portion comprises a first switch configured to selectively couple, in the first mode of operation, the first bus to the load, and a second switch configured to selectively couple, in the first mode of operation, the second bus to the load. In one embodiment, the inverter portion further comprises a third switch configured to selectively couple, in the second mode of operation, the first bus to the load, and a fourth switch configured to selectively couple, in the second mode of operation, the second bus to the load.

According to one embodiment, the clamp circuit comprises a clamp capacitor coupled between the first bus and the second bus, a first diode configured to be coupled to the load via the inverter portion, a second diode configured to be coupled to the load via the inverter portion, and a clamp switch configured to selectively couple the first diode and the second diode to the second bus, wherein, in the third mode of operation, the controller is further configured to operate the clamp switch to close such that energy in the load capacitance discharges to the second bus via the inverter portion and one of the first diode and the second diode. In one embodiment, in the third mode of operation, the controller is further configured to operate the clamp switch to open such that energy in the load capacitance discharges to the clamp capacitor. In another embodiment, the controller is further configured to operate, in the first mode of operation, the clamp circuit to discharge, via the first bus and the inverter portion, energy in the clamp capacitor to the load, and the controller is further configured to operate, in the second mode of operation, the clamp circuit to discharge, via the second bus and the inverter portion, energy in the clamp capacitor to the load.

According to another embodiment, the clamp circuit further comprises a capacitor selectively coupled to the second bus via the clamp switch, and wherein, in the third mode of operation, the controller is further configured to operate the clamp switch to close such that energy in the capacitor is discharged to the second bus. In one embodiment, the clamp circuit further comprises an inductor coupled to the second bus and to the clamp capacitor, wherein, in the third mode of operation, the controller is further configured to operate the clamp switch to open such that energy in the inductor is discharged to the clamp capacitor.

According to one embodiment, the clamp circuit comprises a clamp switch configured to selectively couple the first bus to the second bus, wherein, in the third mode of operation, the controller is further configured to operate the clamp switch to close such that energy in the load capacitance discharges to the second bus via the first bus and the inverter portion. In one embodiment, the inverter portion comprises at least one switch configured to be coupled between the load and the first bus, the at least one switch including a body diode configured to be coupled between the first bus and the load, and, in the third mode of operation, the controller is further configured to operate the clamp switch to close such that energy in the load capacitance discharges to the second bus via the body diode of the at least one switch and the first bus. In another embodiment, in the third mode of operation, the controller is further configured to operate the clamp switch to open such that energy in the load capacitance discharges to the battery.

According to another embodiment, the controller is further configured to operate the DC-AC inverter to transition from the first mode of operation, to the third mode of operation, to the second mode of operation, and back to the first mode of operation such that AC power is provided to the load.

Another aspect in accord with the present invention is directed to a method for operating a DC-AC inverter comprising an input, a DC-DC converter portion coupled to the input, an inverter portion coupled to the DC-DC converter portion, an output configured to be coupled to a load, and clamp circuit including an energy storage device configured to be coupled to the load via the inverter portion, the method comprising receiving, by the DC-DC converter portion via the input, input DC power, converting, in a first mode of operation, the input DC power into DC power having a desired voltage level at a first polarity, providing, in the first mode of operation with the inverter portion, output power having the desired voltage level at the first polarity to the output, converting, in a second mode of operation, the input DC power into DC power having a desired voltage level at a second polarity, providing, in the second mode of operation with the inverter portion, output power having the desired voltage level at the second polarity to the output, driving, in a third mode of operation with the clamp circuit, voltage at the output to zero, receiving, in the third mode of operation by the clamp circuit, energy discharged by a load capacitance at the load via the inverter portion, and storing, in the energy storage device of the clamp circuit, the energy discharged by the load capacitance.

According to one embodiment, the method further comprises discharging, in the first mode of operation, the energy storage device to the load, via a first bus and the inverter portion. In another embodiment, the method further comprises discharging, in the second mode of operation, the energy storage device to the load, via a second bus and the inverter portion. In one embodiment, the method further comprises alternating operation of the DC-AC converter between the first mode of operation, the second mode of operation, and the third mode of operation such that AC power is provided to the output.

At least one aspect in accord with the present invention is directed to a DC-AC inverter comprising an input configured to be coupled to a battery and to receive input DC power from the battery, a DC-DC converter portion coupled to the input and configured to receive the input DC power, an inverter portion coupled to the DC-DC converter portion, an output coupled to the inverter portion and configured to be coupled to a load, a controller coupled to the DC-DC converter portion, the clamp circuit, and the inverter portion, and configured to operate, in a first mode of operation, the DC-DC converter portion to convert the input DC power into DC power having a desired voltage level at a first polarity and the inverter portion to provide output power having the desired voltage level at the first polarity to the output, and operate, in a second mode of operation, the DC-DC converter portion to convert the input DC power into DC power having a desired voltage level at a second polarity and the inverter portion to provide output power having the desired voltage level at the second polarity to the output, and means for clamping, in a third mode of operation, voltage at the output to zero and for transferring, in the first, second, and third modes of operation, energy between the load and an energy storage device via at least one path absent a transformer.

DETAILED DESCRIPTION OF THE INVENTION

Figure 1A:
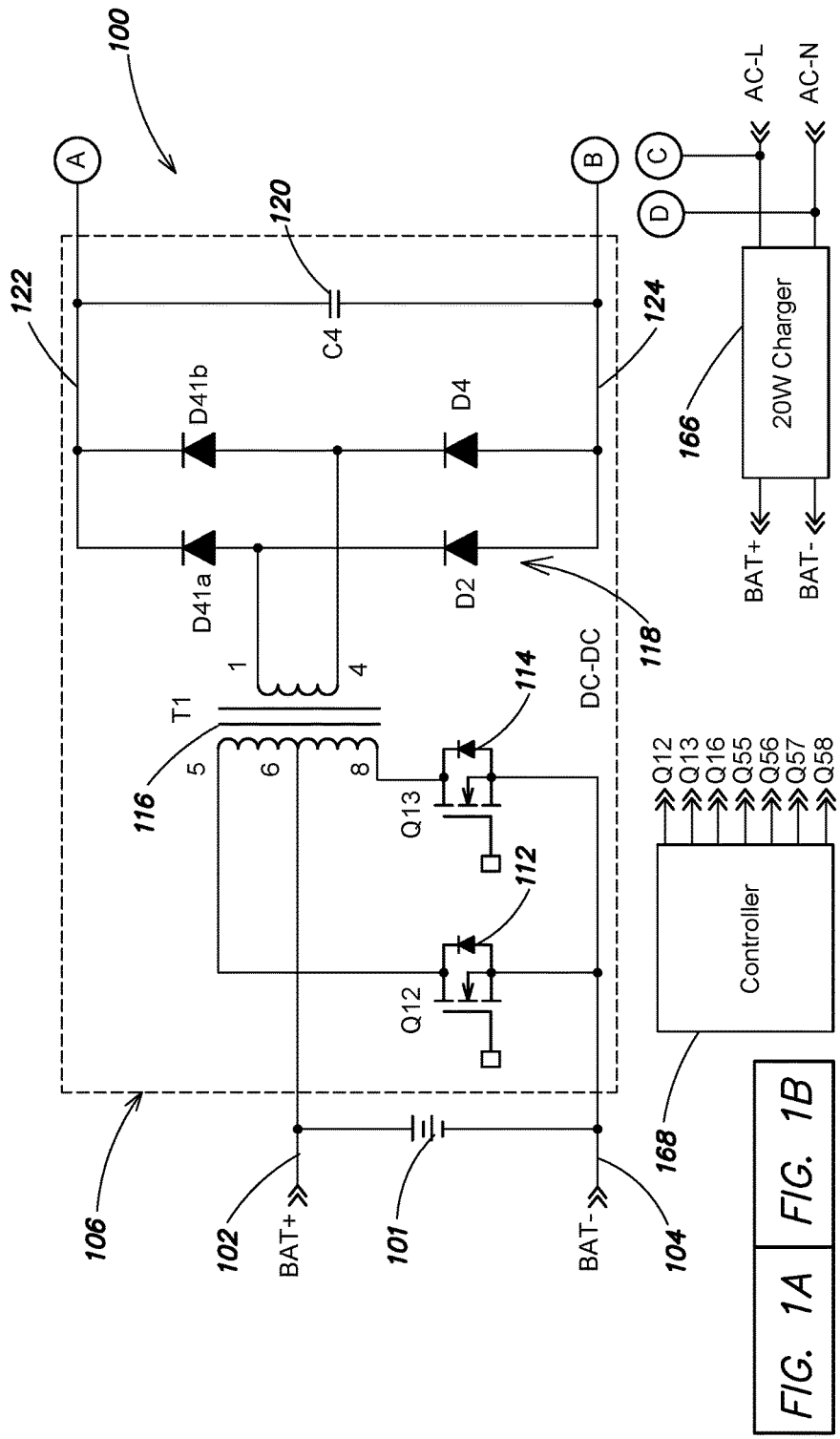
FIGS. 1A and 1B show a circuit diagram illustrating one embodiment of an inverter in accordance with aspects of the present invention.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are no intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

As described above, UPS's typically include inverters which are configured to convert DC power from a DC source (e.g., a DC bus, a battery, etc.) into AC power which is provided to a load. Low frequency, square-wave based inverters typically utilize a clamp circuit to periodically pull voltage at the inverter output to zero when a load capacitance is present. Such inverters also typically utilize an energy recycle circuit to draw reactive energy from the load capacitance back to batteries of the corresponding UPS to improved efficiency of the inverter. However, common energy recycle circuits typically include a long power path between the batteries of the corresponding UPS and the inverter output that may actually result in undesired power loss (e.g., due to the length of the power path and the relatively large number of components included in the long power path). Such energy recycle circuits typically also include inefficient and/or expensive components (e.g., a converter including a transformer). An inverter is provided herein that includes a more efficient and cost effective clamp/energy recycle circuit that is configured to pull voltage at the inverter output to zero while storing reactive energy from a load capacitance in an energy storage device.

Figure 1B:
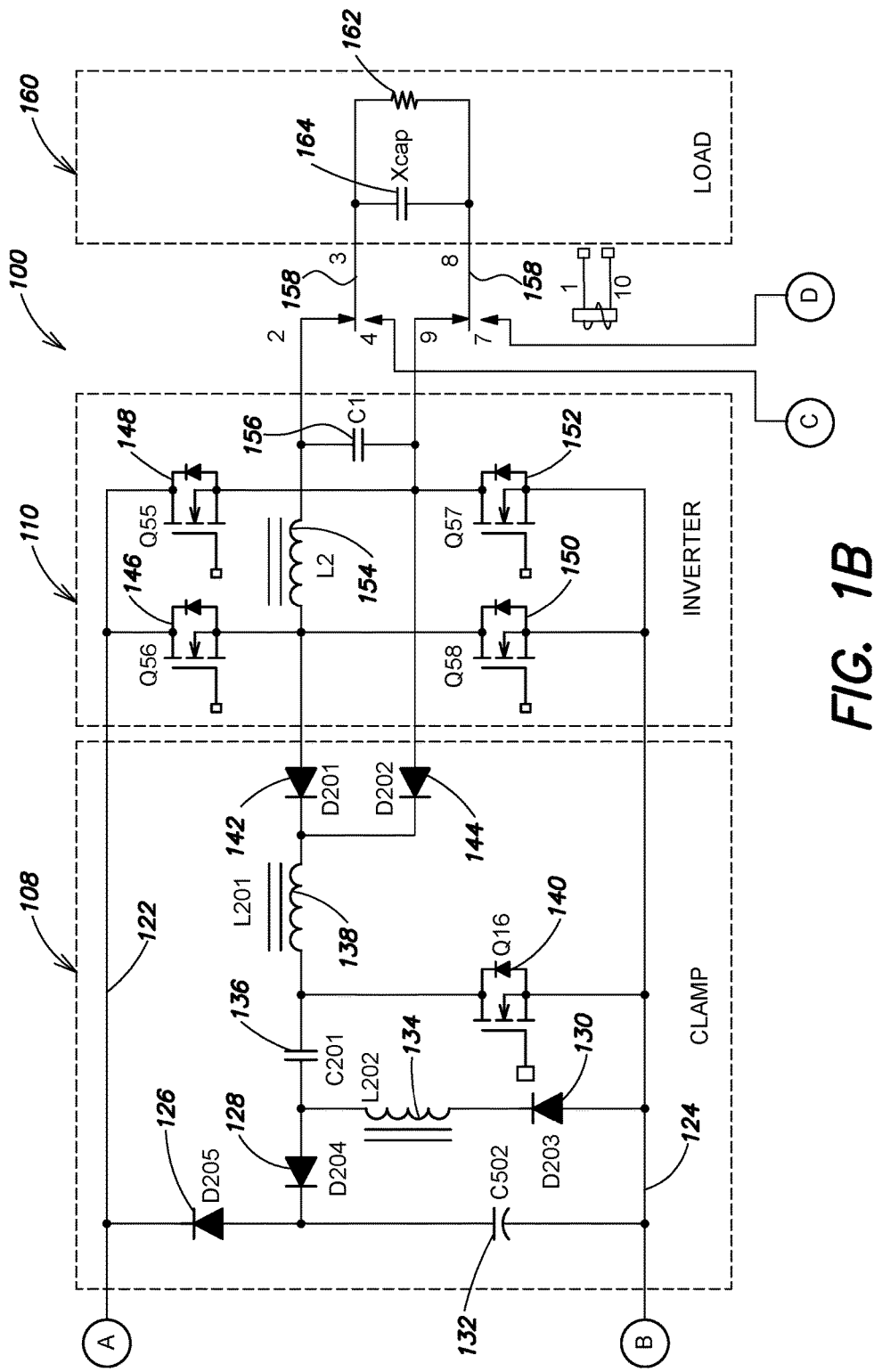

FIGS. 1A and 1B show a circuit diagram of an inverter 100 in accordance with aspects described herein. The inverter 100 includes a positive battery input 102, a negative battery input 104, a DC-DC converter portion 106, a clamp circuit 108, an inverter portion 110, a positive bus 122, and a negative bus 124. The DC-DC converter portion 106 includes a switch Q12 112, a switch Q13 114, a transformer 116, a plurality of diodes 118 (including diodes D41a, D41B, D2, and D4) and a capacitor C4. According to one embodiment, the switch Q12 112 and the switch Q13 114 are Metal-Oxide-Semiconductor Field-Effect Transistors (MOSFET); however, in other embodiments, any other appropriate type of switch may be utilized. The positive battery input 102 is configured to be coupled to a positive terminal of a battery 101 and to a center tap of a primary winding of the transformer 116. The negative battery input 104 is configured to be coupled to a negative terminal of the battery 101, to the source of switch Q12 112, and to the source of switch Q13 114. The drain of switch Q12 112 is coupled to a first end of the primary winding of the transformer 116 and the drain of switch Q13 114 is coupled to a second end of the primary winding of the transformer 116.

Within the plurality of diodes 118, the anode of diode D41a is coupled to the cathode of diode D2 and to a first end of a secondary winding of the transformer 116. The cathode of diode D41a is coupled to the positive bus 122. The anode of diode D41b is coupled to the cathode of diode D4 and to a second end of the secondary winding of the transformer. The anode of diode D41b is coupled to the positive bus 122. The anode of diode D2 is coupled to the negative bus 124. The anode of diode D4 is coupled to the negative bus 124. The capacitor C4 120 is coupled between the positive bus 122 and the negative bus 124.

The clamp circuit 108 includes a diode D205 126, a diode D204 128, a diode D203 130, a clamp capacitor C502 132, an inductor L202 134, a capacitor C201 136, an inductor L201 138, a clamp switch 140, a diode D201 142, and a diode D202 144. According to one embodiment, the switch Q16 140 is a MOSFET; however, in other embodiments, any other appropriate type of switch may be utilized. The cathode of diode D205 126 is coupled to the positive bus 122. The anode of the diode D2105 126 is coupled to the cathode of diode D204 128 and to a first terminal of clamp capacitor C502 132. A second terminal of clamp capacitor C502 132 is coupled to the negative bus 124. The anode of diode D204 128 is coupled to a first terminal of capacitor C201 136 and to a first end of the inductor L202 134. The second end of the inductor L202 134 is coupled to the cathode of diode D203 130. The anode of diode D203 130 is coupled to the negative bus 124. The second terminal of capacitor C201 136 is coupled to a first terminal of the inductor L201 138 and to the drain of switch Q16 140. The source of switch Q16 140 is coupled to the negative bus 124. The second end of the inductor L201 138 is coupled to the cathode of diode D201 142 and to the cathode of diode D202 144.

The inverter portion 110 includes switch Q56 146, switch Q55 148, switch Q58 150, switch Q57 152, inductor L2 154 and capacitor C1 156. According to one embodiment, the switches Q56 146, Q55 148, Q58 150, and Q57 152 are MOSFETs; however, in other embodiments, any other appropriate type of switch may be utilized. The drain of switch Q56 146 is coupled to the positive bus 122. The source of switch Q56 146 is coupled to the anode of diode D201 142 and to a first end of the inductor L2 154. The drain of switch Q58 150 is coupled to the source of switch Q56 146. The source of switch Q58 is coupled to the negative bus 124. The drain of switch Q55 148 is coupled to the positive bus 122. The source of switch Q55 148 is coupled to the anode of diode D202 144 and to the drain of switch Q57 152. The source of switch Q57 152 is coupled to the negative bus 124. The second end of inductor L2 154 is coupled to an output 158 of the inverter 100. The anode of diode D202 is also coupled to the output 158 of the inverter 100. The capacitor C1 156 is coupled between the second end of inductor L2 154 and the anode of diode D202.

The output 158 of the inverter 100 is configured to be coupled to a load portion 160. The load portion 160 may include a load 162 and a corresponding load capacitance (Xcap) 164. According to one embodiment, the output 158 of the inverter 100 is also configured to be coupled to a charger 166 that is configured to draw power from the output 158 to charge the battery 101. According to one embodiment, a controller 168 is coupled to the gate of each switch (e.g., Q12 112, Q13, 114, Q16 140, Q55 148, Q56 146, Q57 152, Q58 150) and configured to provide a control signal to the gate of each switch to control the switching operation of each switch. According to one embodiment, each switch (e.g., Q12 112, Q13, 114, Q16 140, Q55 148, Q56 146, Q57 152, Q58 150) also includes a body diode coupled between its source and drain. Operation of the inverter 100 is discussed in greater detail below with respect to FIGS. 2-8B.

Figure 2:
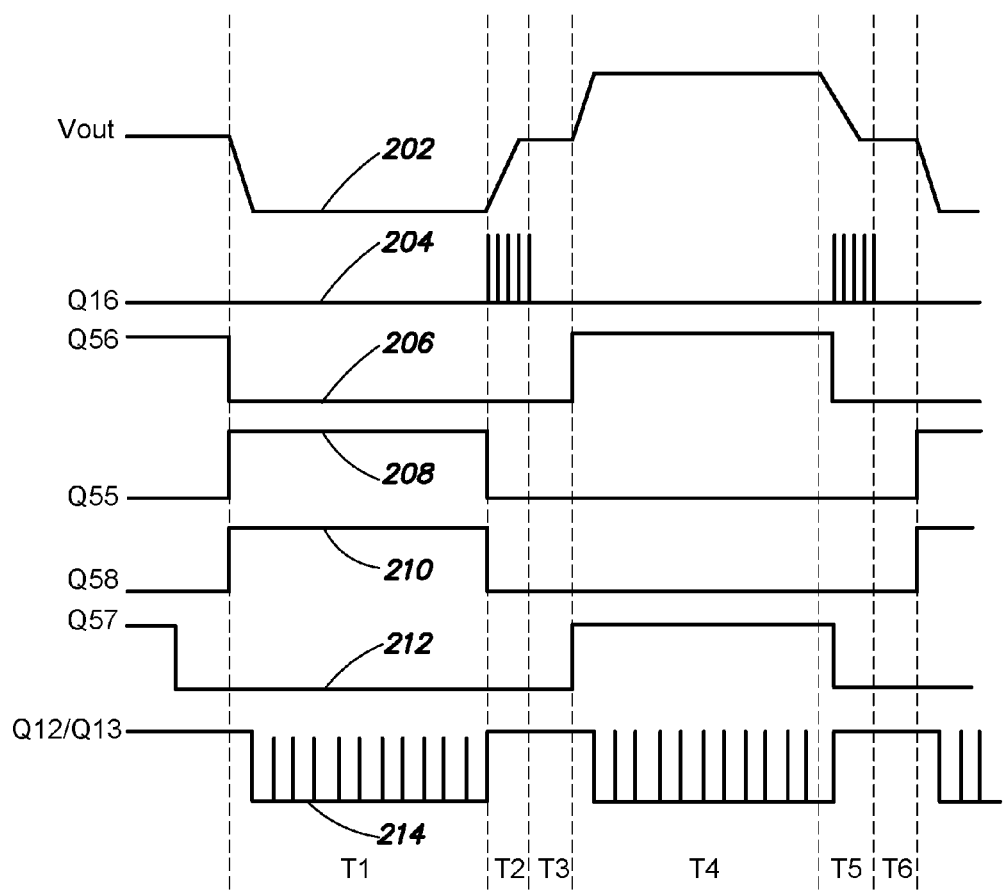
FIG. 2 is a timing diagram illustrating operation of one embodiment of an inverter in accordance with aspects of the present invention.

FIG. 2 is a timing diagram 200 illustrating operation of the inverter 100 in accordance with aspects described herein. The timing diagram 200 includes a first trace 202 representing the voltage (Vout) at the output 158 of the inverter 100, a second trace 204 representing the control signal provided to the gate of switch Q16 140 by the controller 168, a third trace 206 representing the control signal provided to the gate of switch Q56 146 by the controller 168, a fourth trace 208 representing the control signal provided to the gate of switch Q55 148 by the controller 168, a fifth trace 210 representing the control signal provided to the gate of switch Q58 150 by the controller 168, a sixth trace 212 representing the control signal provided to the gate of switch Q57 152 by the controller 168, and a seventh trace 214 representing the control signal provided to the gate of switch Q12 112 and the gate of switch Q13 114 by the controller 168.

Figures 3A, 3B:
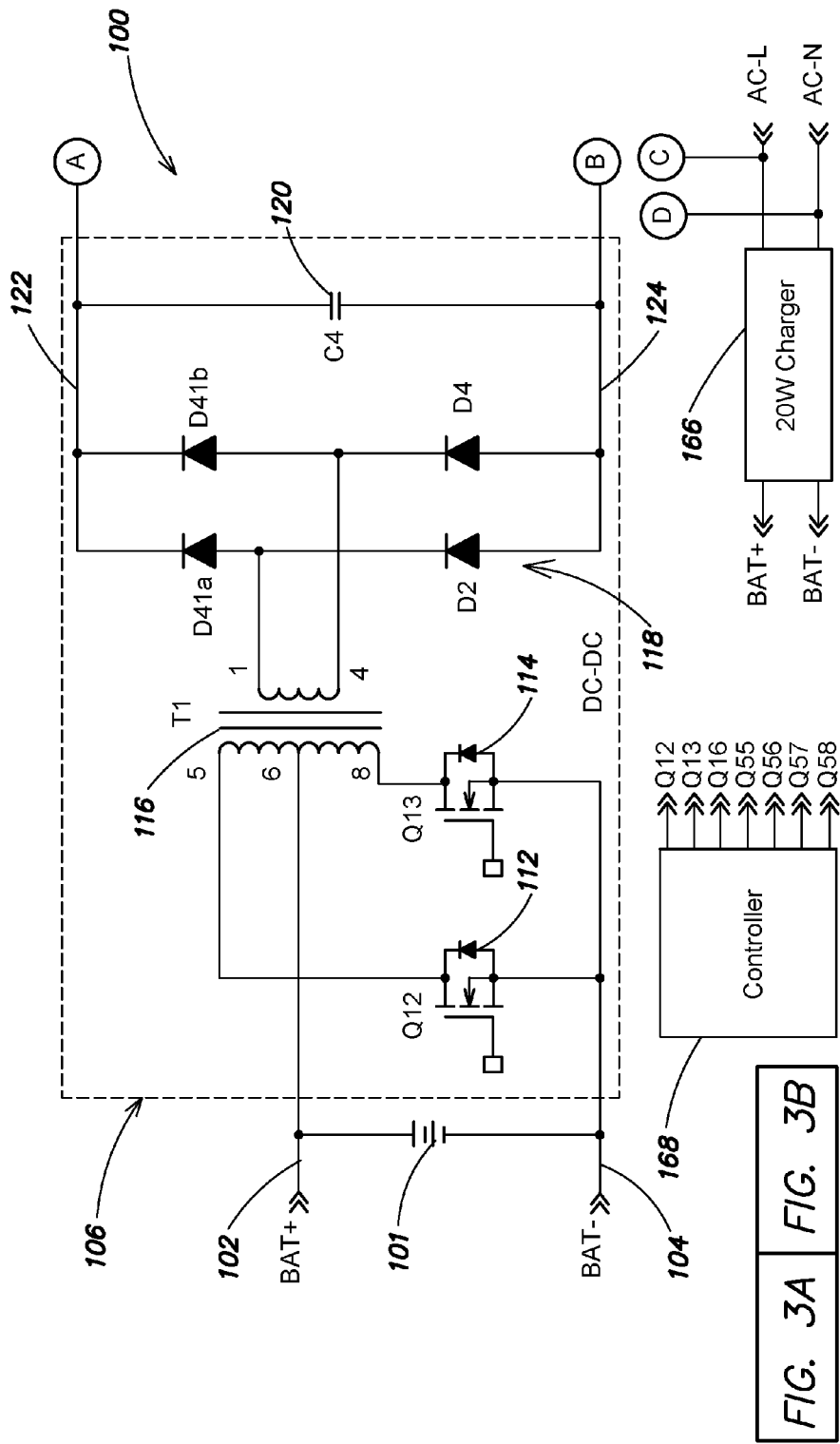
FIGS. 3A and 3B show a circuit diagram illustrating operation of one embodiment of an inverter in accordance with aspects of the present invention.
Figure 3B:
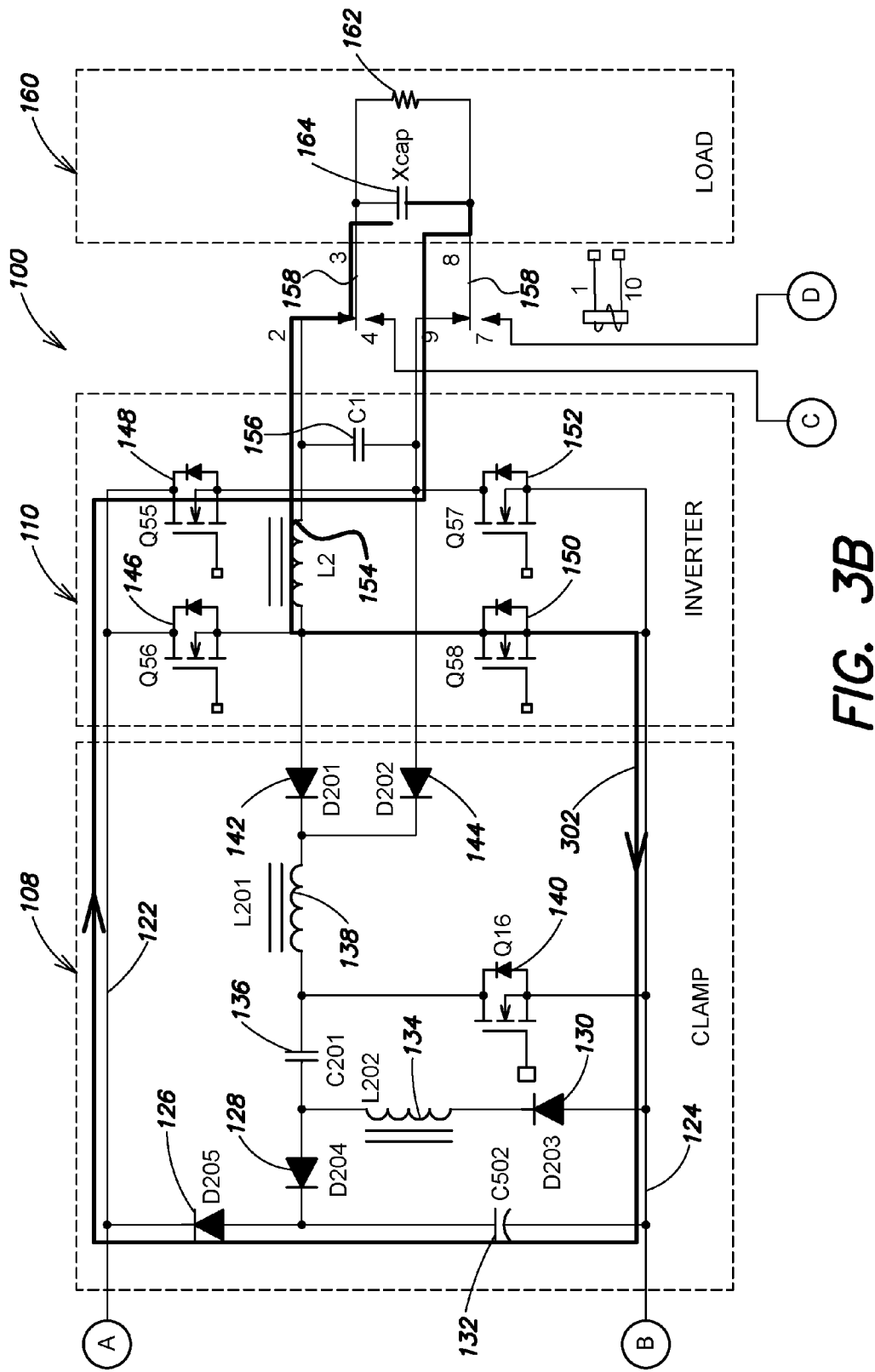

FIGS. 3A and 3B show a circuit diagram of the inverter 100 during a first time period (T1). During the first time period (T1) (where the output voltage (Vout) 202 of the inverter 100 is negative), the controller 168 provides a control signal 208 (e.g., a high control signal) to switch Q55 148 to turn on switch Q55 148 and provides a control signal 210 (e.g., a high control signal) to switch Q58 150 to turn on switch Q58. As shown in FIG. 3B, once switch Q55 148 and switch Q58 150 are turned on (i.e., closed), charge stored on the clamp capacitor C502 132 is discharged to the load 162 via a discharge path 302 including the diode D205 126, the switch Q55 148, the inductor L2 154, and the switch Q58 150. Also during the first time period (T1), the DC-DC converter portion 106 receives DC power from the battery 101 and the controller 168 provides control signals 214 to switches Q12 112 and Q13 114 to operate the switches Q12 112 and Q13 114 (in conjunction with the transformer 116 and the plurality of diodes 118) to convert the DC power from the battery 101 into DC power having a desired negative voltage level. The converted DC power having the desired negative voltage level is provided to the load 162 via the negative bus 124 and the inverter portion 110.

FIGS. 4A-5B are circuit diagrams of the inverter 100 during a second time period (T2). During the second time period (T2) (where the output voltage (Vout) 202 of the inverter 100 is still negative), the DC-DC converter portion 106, switch Q55 148, and switch Q58 150 are turned off by the controller 168. Also during the second time period (T2), the clamp circuit 108 is activated (i.e., the controller 168 provides control signals 204 to switch Q16 140 to control the operation of switch Q16 140) to clamp the output voltage of the inverter 100 to zero.

Figure 4A:
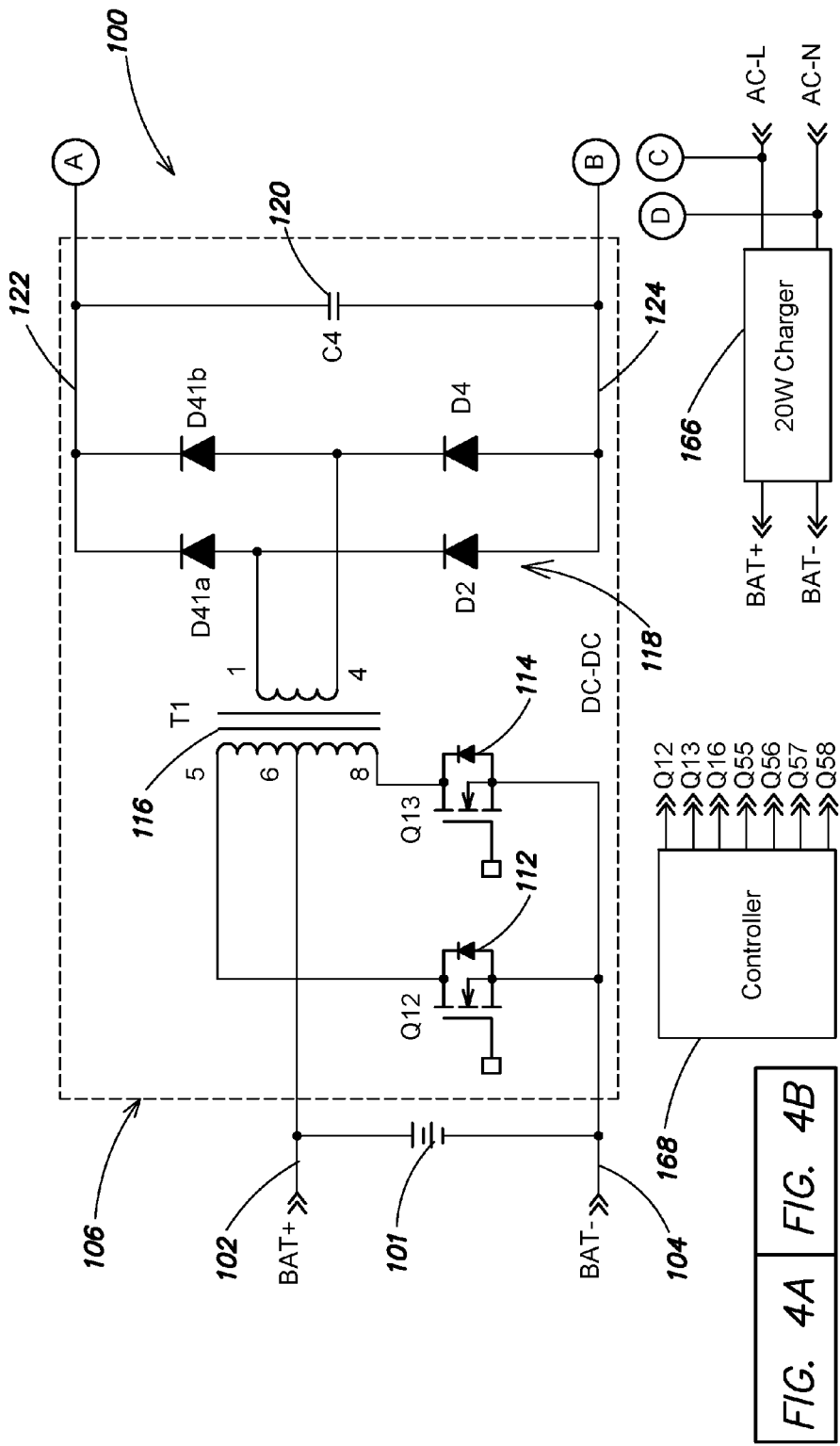
FIGS. 4A and 4B show a circuit diagram illustrating operation of one embodiment of an inverter in accordance with aspects of the present invention.
Figure 4B:
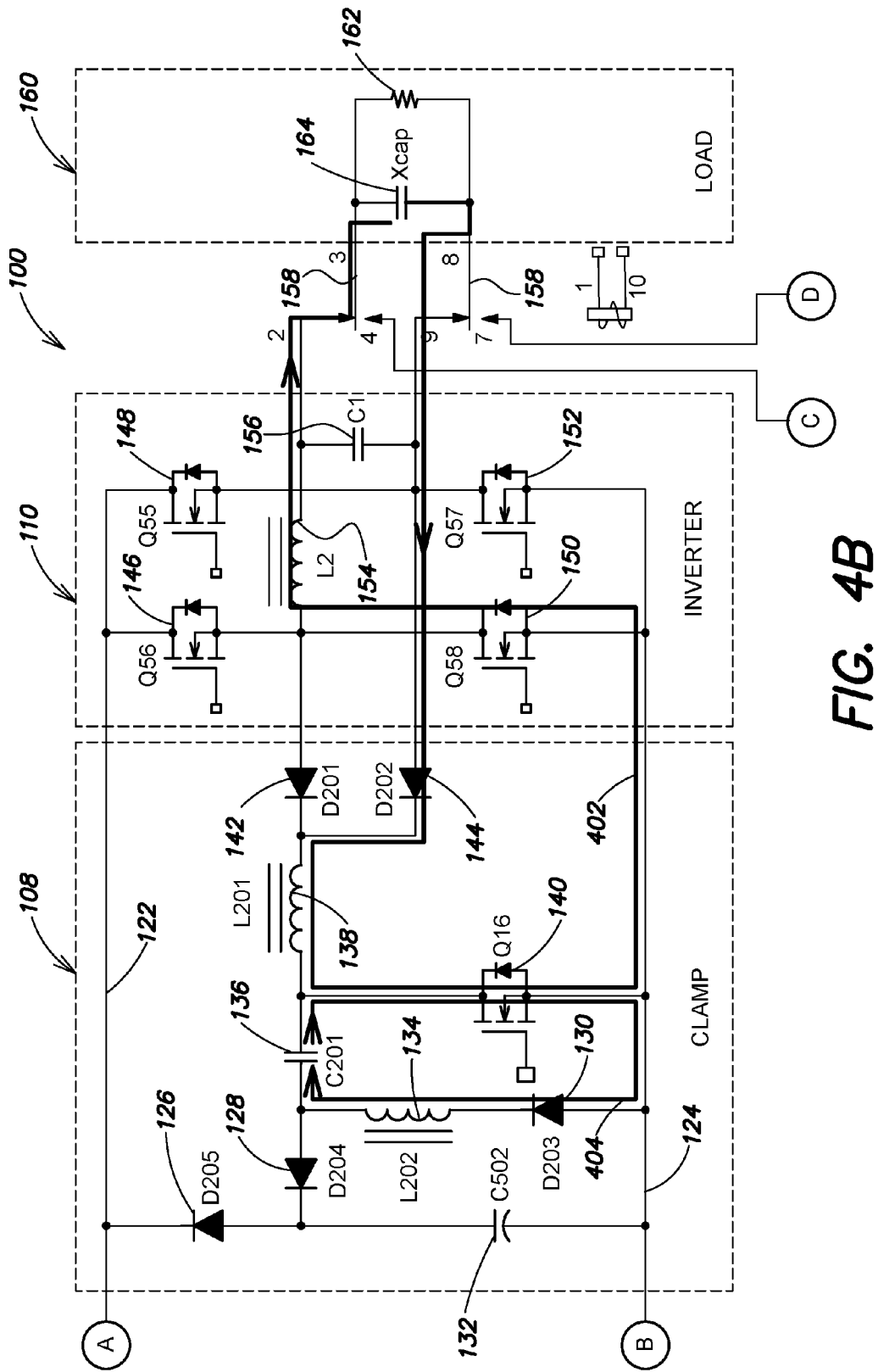

More specifically, FIGS. 4A and 4B show a circuit diagram of the inverter 100 during the second time period (T2) when the controller 168 operates switch Q16 140 to turn on (i.e., close). As shown in FIG. 4B, once switch Q16 140 is turned on, the load capacitance (Xcap) 164 is discharged via a discharge path 402 including diode D202 144, inductor L201 138, switch Q16 140, the body diode of switch Q58 150, and inductor L2 154. Also during the second time period (T2) when the switch Q16 140 is turned on, the capacitor C201 136 is discharged via a discharge path 404 including switch Q16 140, diode D203 130, and inductor L202 134. During the second time period (T2) when the switch Q16 is turned on, current through inductor L202 134, inductor L201 138 and inductor L2 154 ramps up and the voltage across the load capacitor (Xcap) 164 and the capacitor C502 132 ramps down.

Figure 5A:
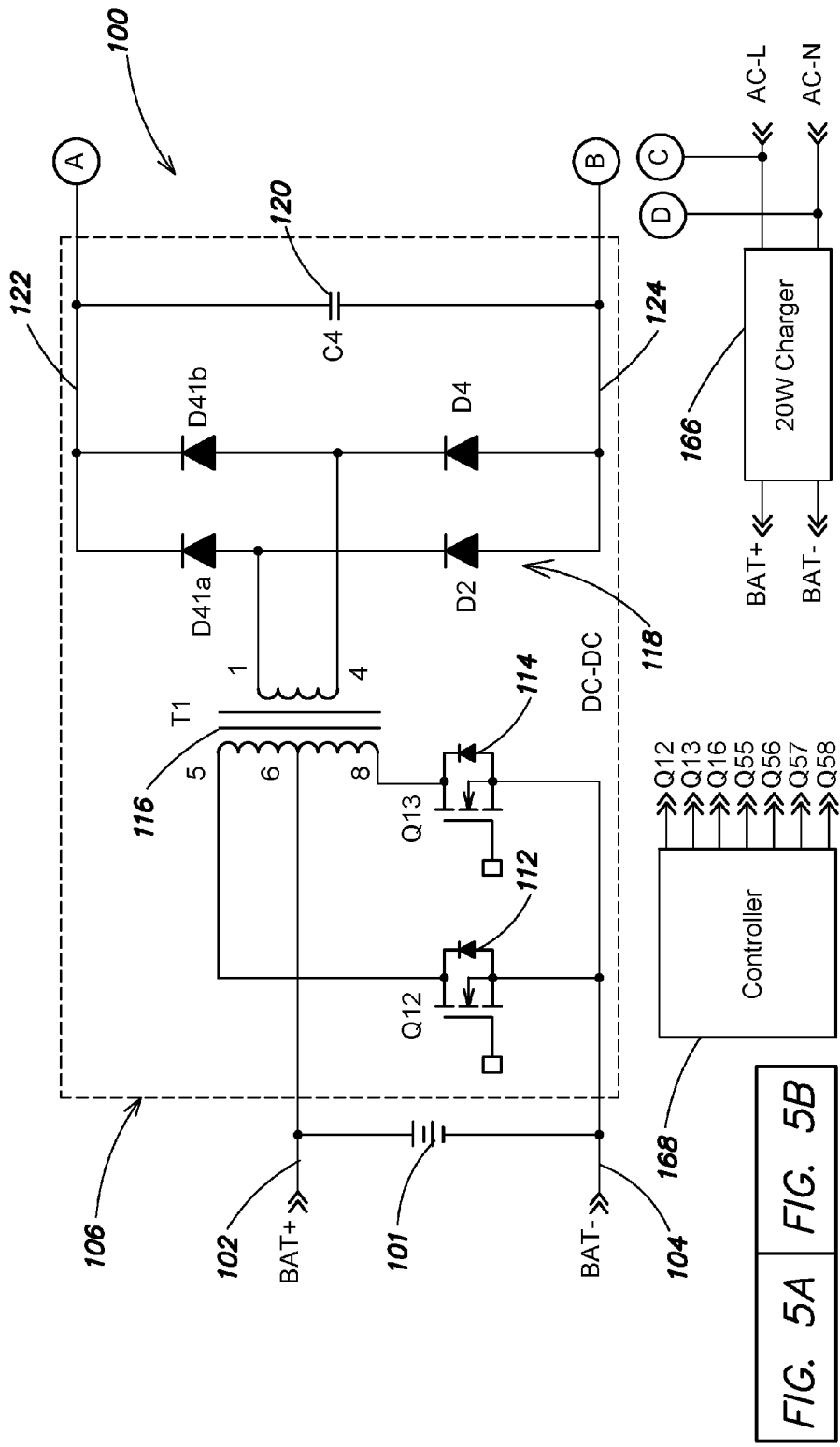
FIGS. 5A and 5B show a circuit diagram illustrating operation of one embodiment of an inverter in accordance with aspects of the present invention.
Figure 5B:
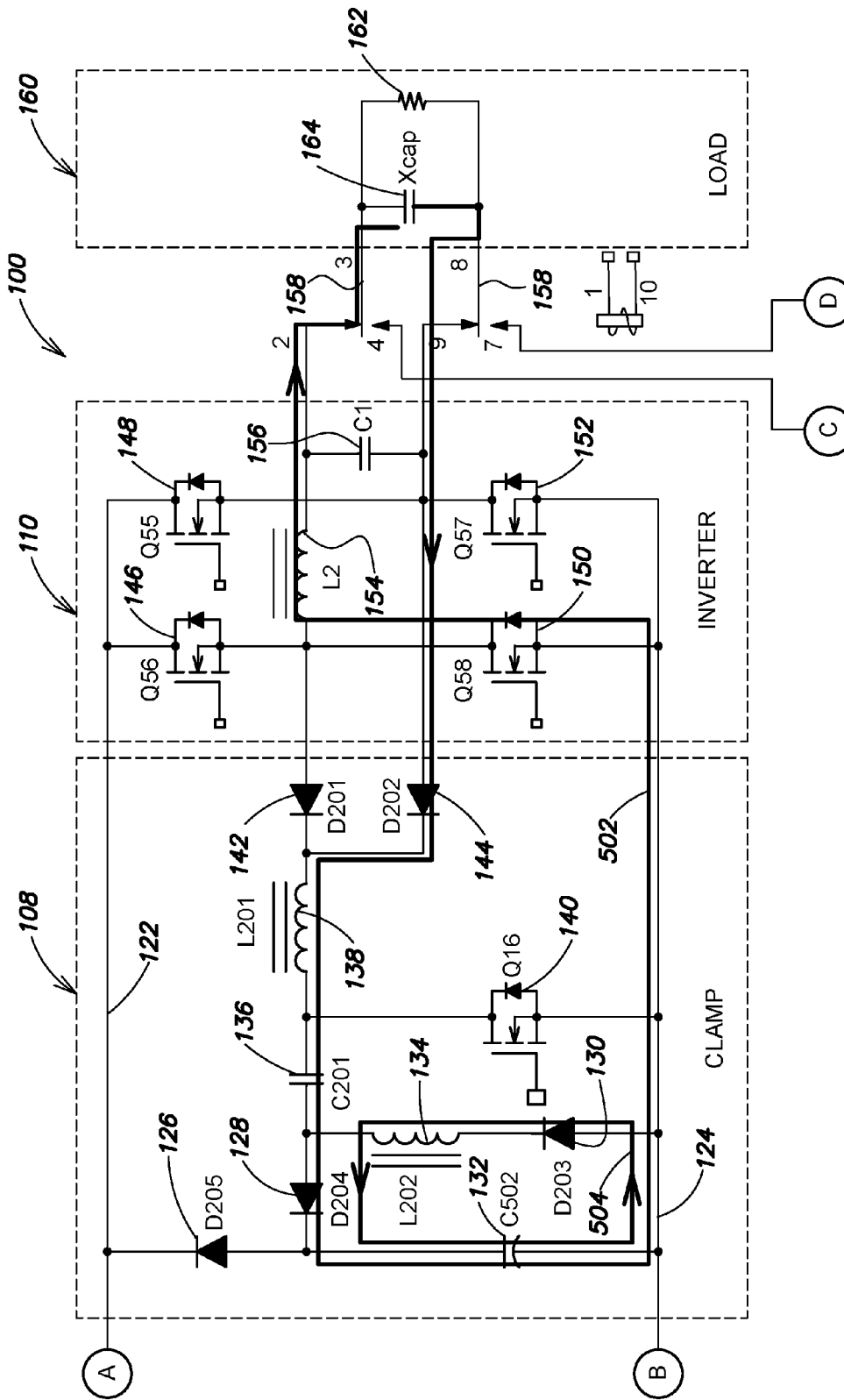

FIGS. 5A and 5B show a circuit diagram of the inverter 100 during the second time period (T2) when the controller 168 operates switch Q16 140 to turn off (i.e., open). As shown in FIG. 5B, once switch Q16 140 is turned off, the load capacitance (Xcap) 164 is discharged via a discharge path 502 including diode D202 144, inductor L201 138, capacitor C201 136, diode D204 128, capacitor C502 132, the body diode of switch Q58 150, and the inductor L2 154. Also during the second time period (T2) when the switch Q16 140 is turned off, the inductor L202 134 is discharged via a discharge path 504 including diode D204 128, capacitor C502 132, and diode D203 130. During the second time period (T2) when the switch Q16 is turned off, current through inductor L202 134, inductor L201 138 and inductor L2 154 ramps down, the voltage across the load capacitor (Xcap) 164 ramps down, and the voltage across the capacitor C502 132 ramps up.

Figure 6A:
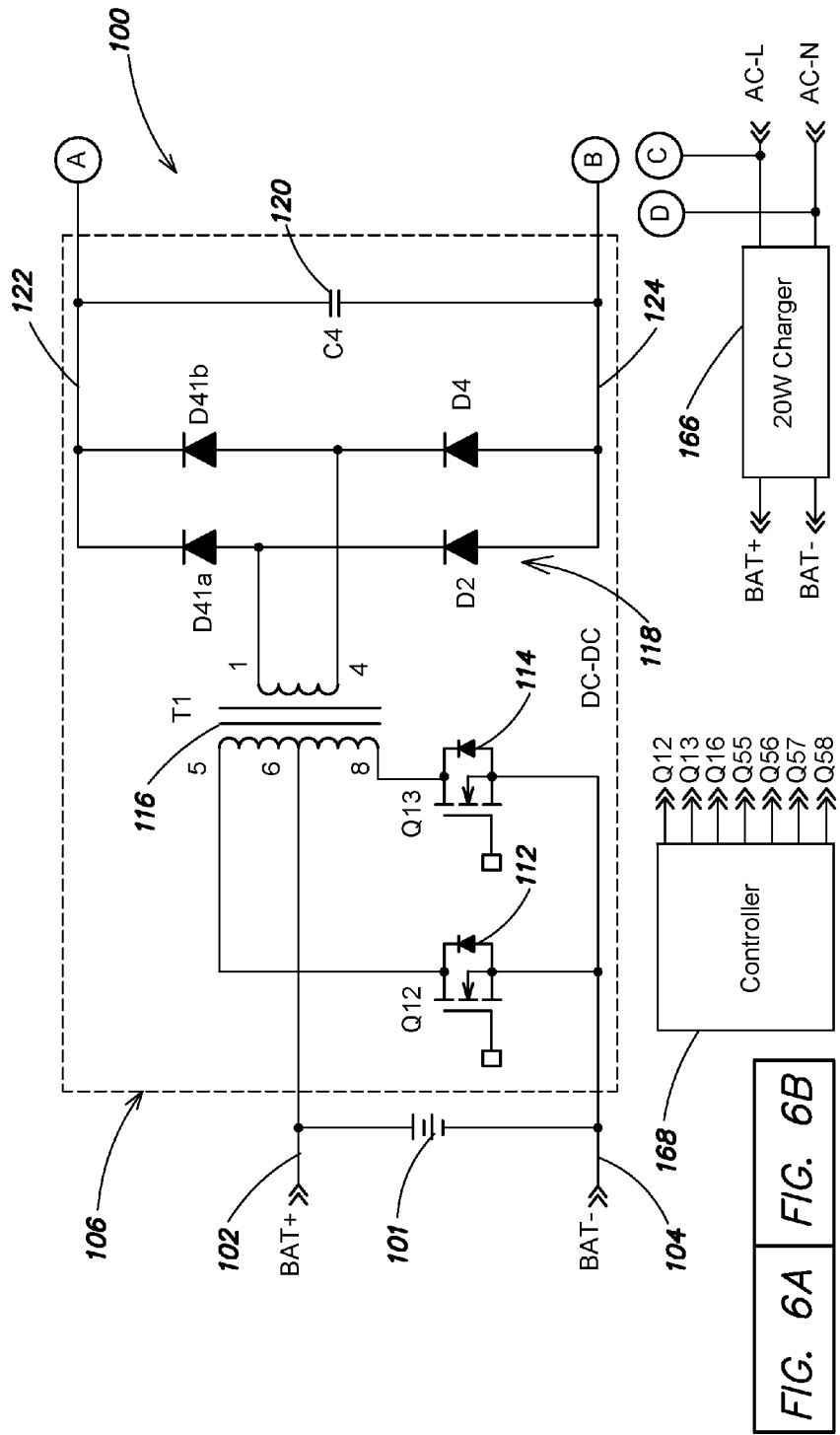
FIGS. 6A and 6B show a circuit diagram illustrating operation of one embodiment of an inverter in accordance with aspects of the present invention.
Figure 6B:
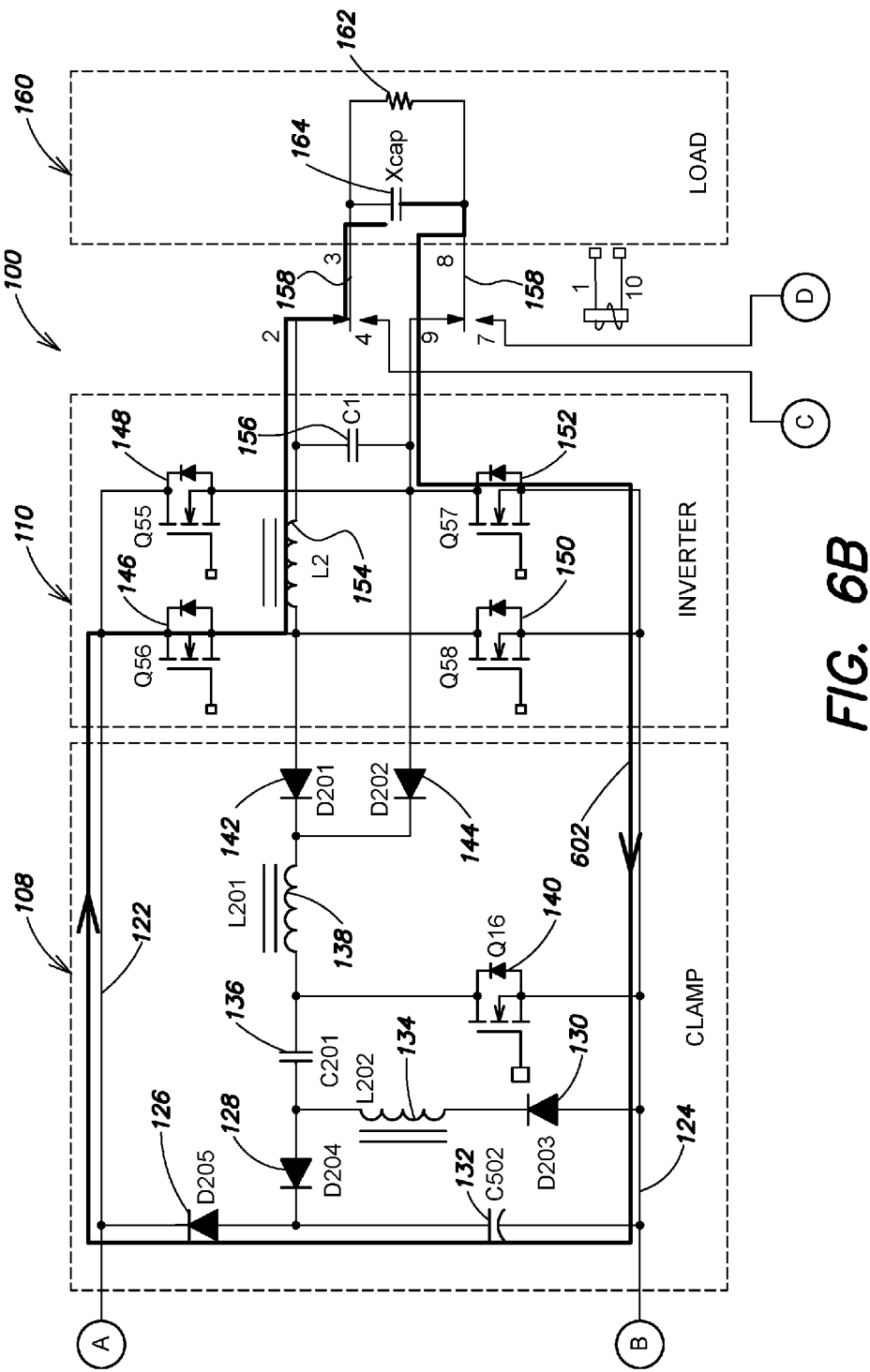

During a third time period (T3), the controller 168 operates the DC-DC portion 106, the clamp circuit 108, and the inverter portion 110 to turn off. FIGS. 6A and 6B show a circuit diagram of the inverter 100 during a fourth time period (T4). During the fourth time period (T4) (where the output voltage (Vout) 202 of the inverter 100 is positive), the controller 168 provides a control signal 206 (e.g., a high control signal) to switch Q56 146 to turn on switch Q56 146 and provides a control signal 212 (e.g., a high control signal) to switch Q57 152 to turn on switch Q57 152. As shown in FIG. 6B, once switch Q56 146 and switch Q57 152 are turned on (i.e., closed), charge stored on the clamp capacitor C502 132 is discharged to the load 162 via a discharge path 602 including the diode D205 126, the switch Q56 146, the inductor L2 154, and the switch Q57 152. Also during the fourth time period (T4), the DC-DC converter portion 106 receives DC power from the battery 101 and the controller 168 provides control signals 214 to switches Q12 112 and Q13 114 to operate the switches Q12 112 and Q13 114 (in conjunction with the transformer 116 and the plurality of diodes 118) to convert the DC power from the battery 101 into DC power having a desired positive voltage level. The converted DC power having the desired positive voltage level is provided to the load 162 via the positive bus 122 and the inverter portion 110.

FIGS. 7A-8B are circuit diagrams of the inverter 100 during a fifth time period (T5). During the fifth time period (T5) (where the output voltage (Vout) 202 of the inverter 100 is still positive), the DC-DC converter portion 106, switch Q56 146, and switch Q57 152 are turned off by the controller 168. Also during the fifth time period (T5), the clamp circuit 108 is activated (i.e., the controller 168 provides control signals 204 to switch Q16 140 to control the operation of switch Q16 140) to clamp the output voltage of the inverter 100 to zero.

Figure 7A:
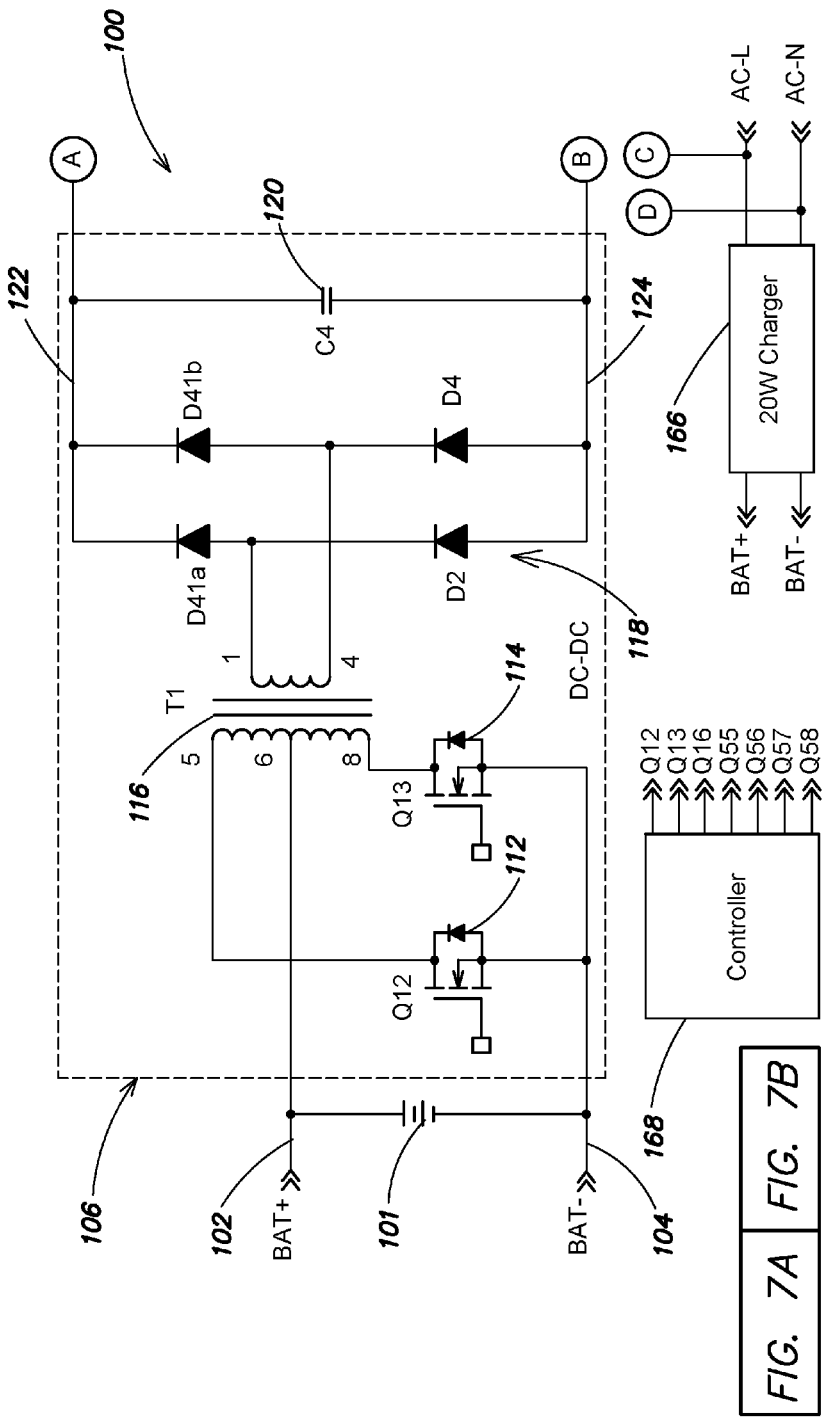
FIGS. 7A and 7B show a circuit diagram illustrating operation of one embodiment of an inverter in accordance with aspects of the present invention.
Figure 7B:
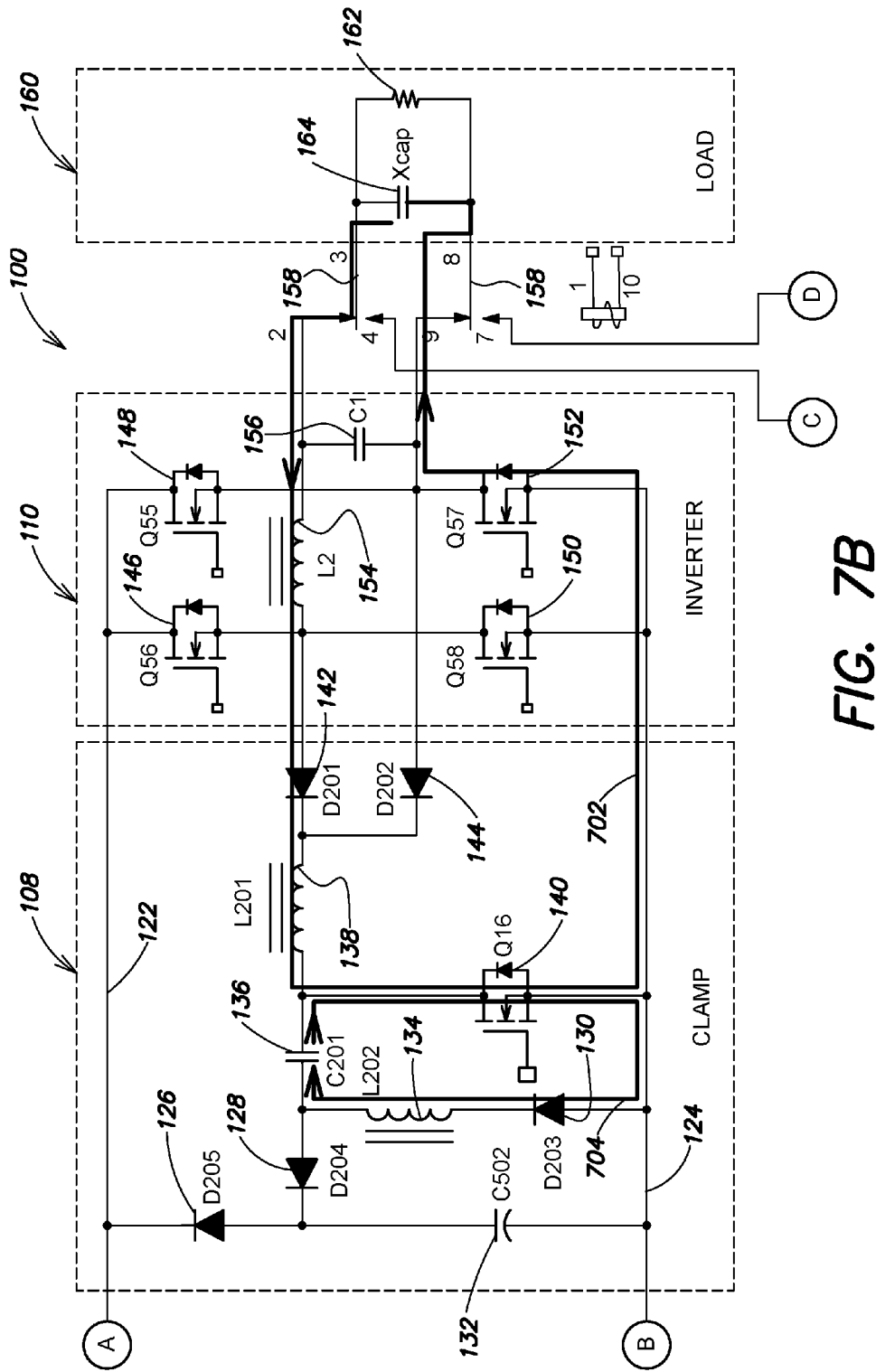

More specifically, FIGS. 7A and 7B show a circuit diagram of the inverter 100 during the fifth time period (T5) when the controller 168 operates switch Q16 140 to turn on (i.e., close). As shown in FIG. 7B, once switch Q16 140 is turned on, the load capacitance (Xcap) 164 is discharged via a discharge path 702 including inductor L2 154, diode D201 142, inductor L201 138, switch Q16 140, and the body diode of switch Q57 152. Also during the fifth time period (T5) when the switch Q16 140 is turned on, the capacitor C201 136 is discharged via a discharge path 704 including switch Q16 140, diode D203 130, and inductor L202 134. During the fifth time period (T5) when the switch Q16 is turned on, current through inductor L202 134, inductor L201 138 and inductor L2 154 ramps up and the voltage across the load capacitor (Xcap) 164 and the capacitor C502 132 ramps down.

Figure 8A:
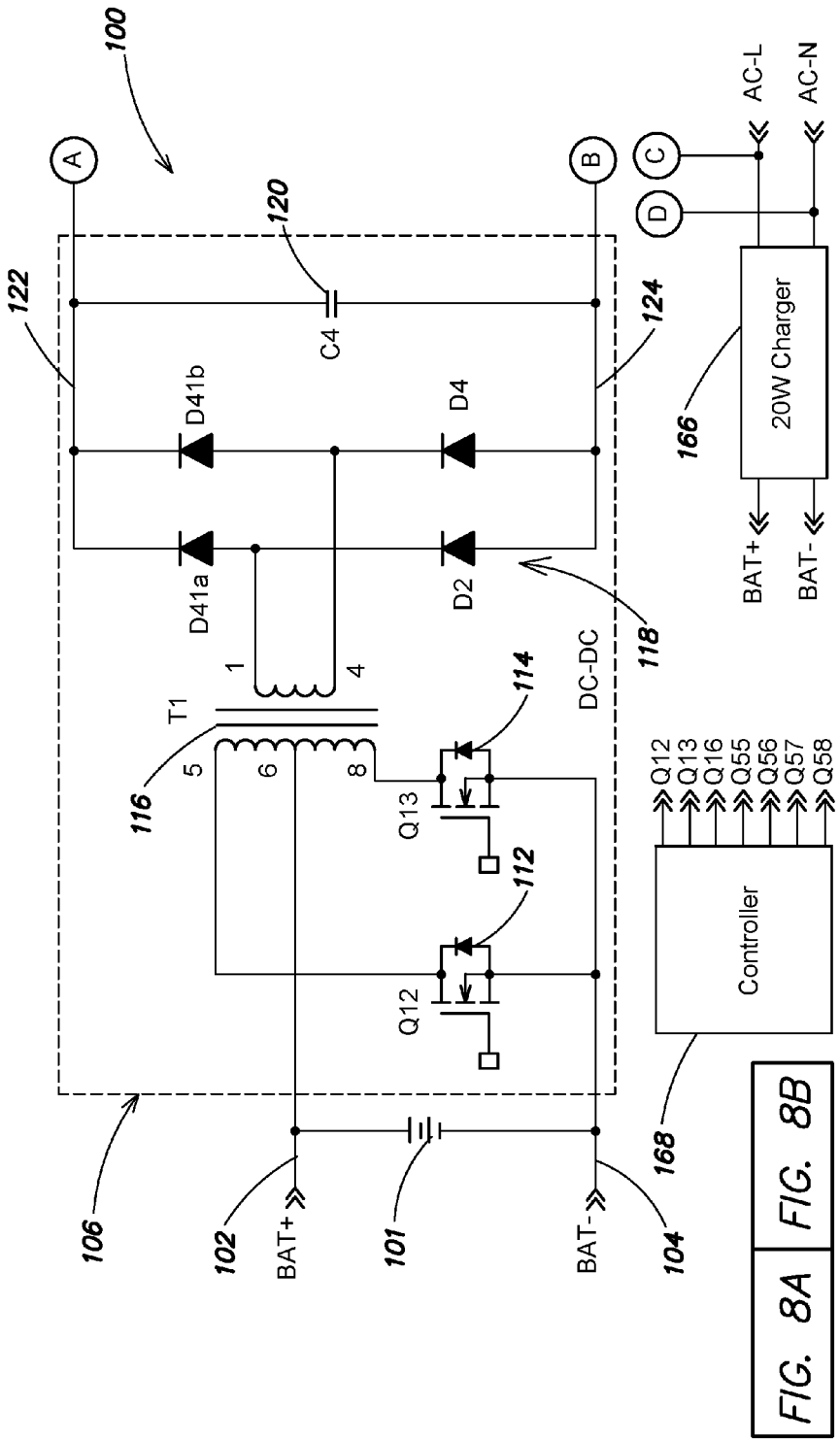
FIGS. 8A and 8B show a circuit diagram illustrating operation of one embodiment of an inverter in accordance with aspects of the present invention.
Figure 8B:
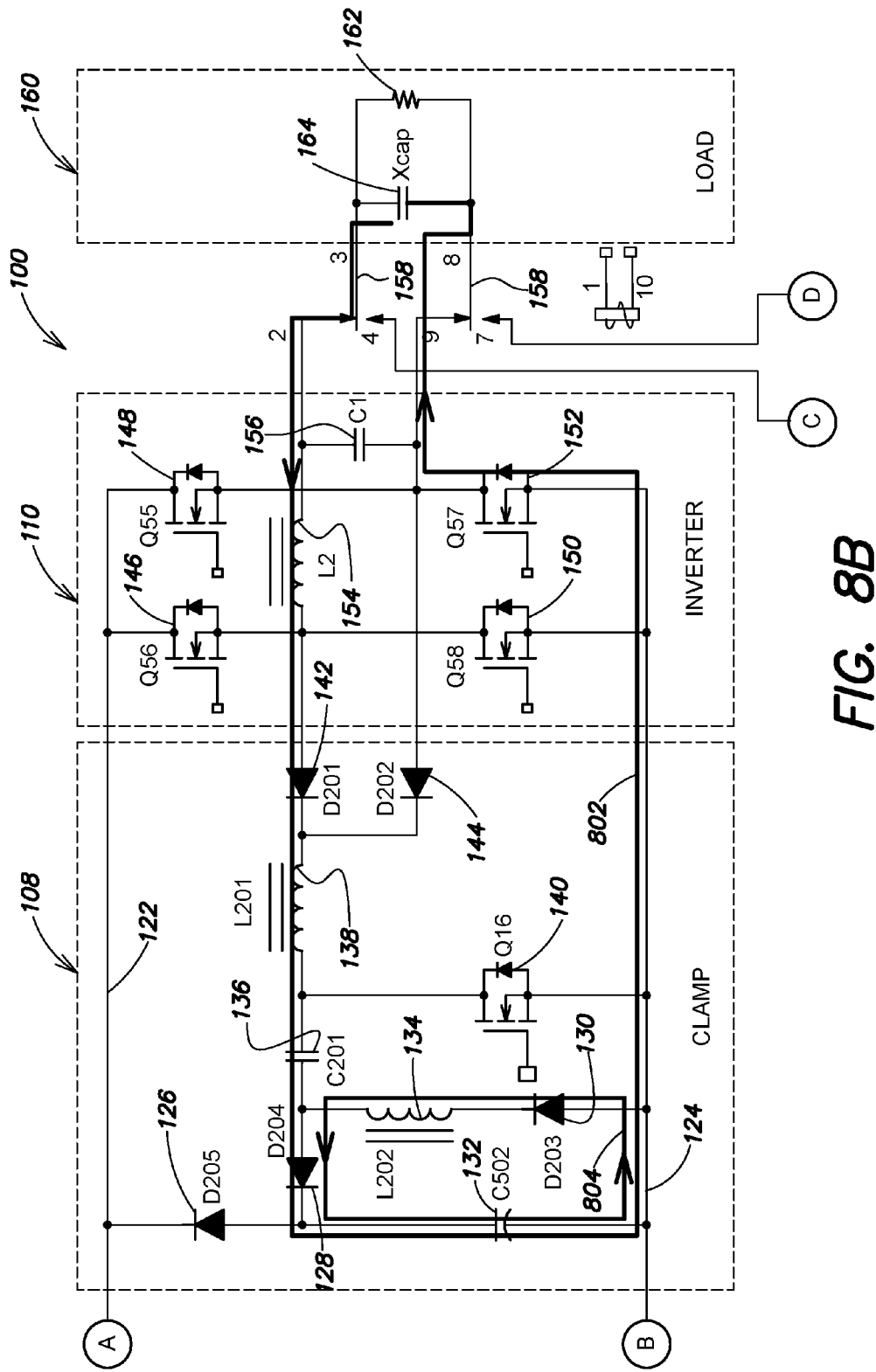

FIGS. 8A and 8B show a circuit diagram of the inverter 100 during the fifth time period (T5) when the controller 168 operates switch Q16 140 to turn off (i.e., open). As shown in FIG. 8B, once switch Q16 140 is turned off, the load capacitance (Xcap) 164 is discharged via a discharge path 802 including inductor L2 154, diode D201 142, inductor L201 138, capacitor C201 136, diode D204 128, capacitor C502 132, and the body diode of switch Q57 152. Also during the fifth time period (T5) when the switch Q16 140 is turned off, the inductor L202 134 is discharged via a discharge path 804 including diode D204 128, capacitor C502 132, and diode D203 130. During the fifth time period (T5) when the switch Q16 is turned off, current through inductor L202 134, inductor L201 138 and inductor L2 154 ramps down, the voltage across the load capacitor (Xcap) 164 ramps down, and the voltage across the capacitor C502 132 ramps up. During a sixth time period (T6), the controller 168 operates the DC-DC portion 106, the clamp circuit 108, and the inverter portion 110 to turn off. As shown in FIG. 2, over time periods T1-T6, the inverter 100 outputs a complete AC line frequency cycle to the load 162. In one embodiment, the AC voltage 202 output by the inverter 100 is a square wave having a frequency of 50-60 Hz; however, in other embodiments, the output AC voltage 202 may be configured differently.

Figure 9A:
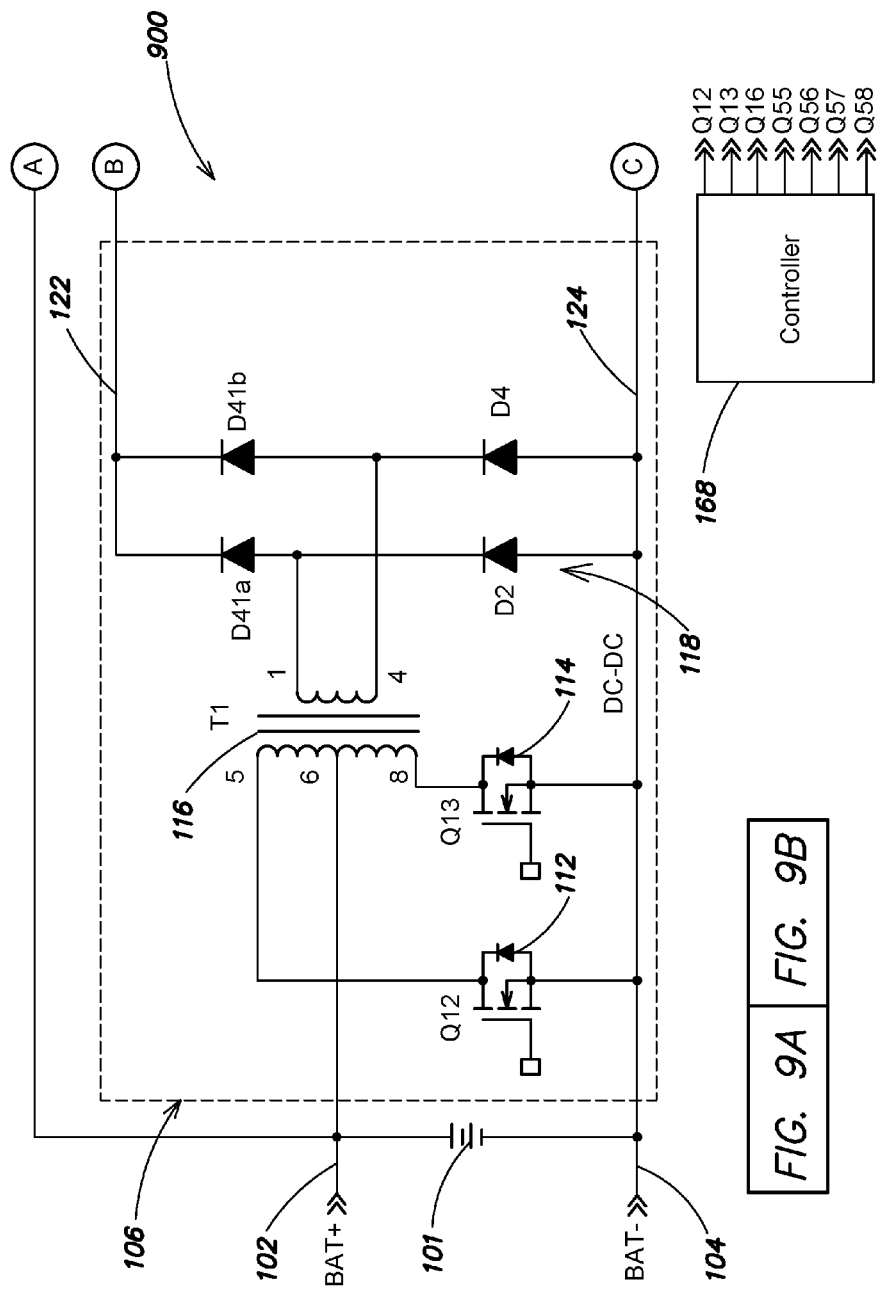
FIGS. 9A and 9B show a circuit diagram of another embodiment of an inverter in accordance with aspects of the present invention.
Figure 9B:
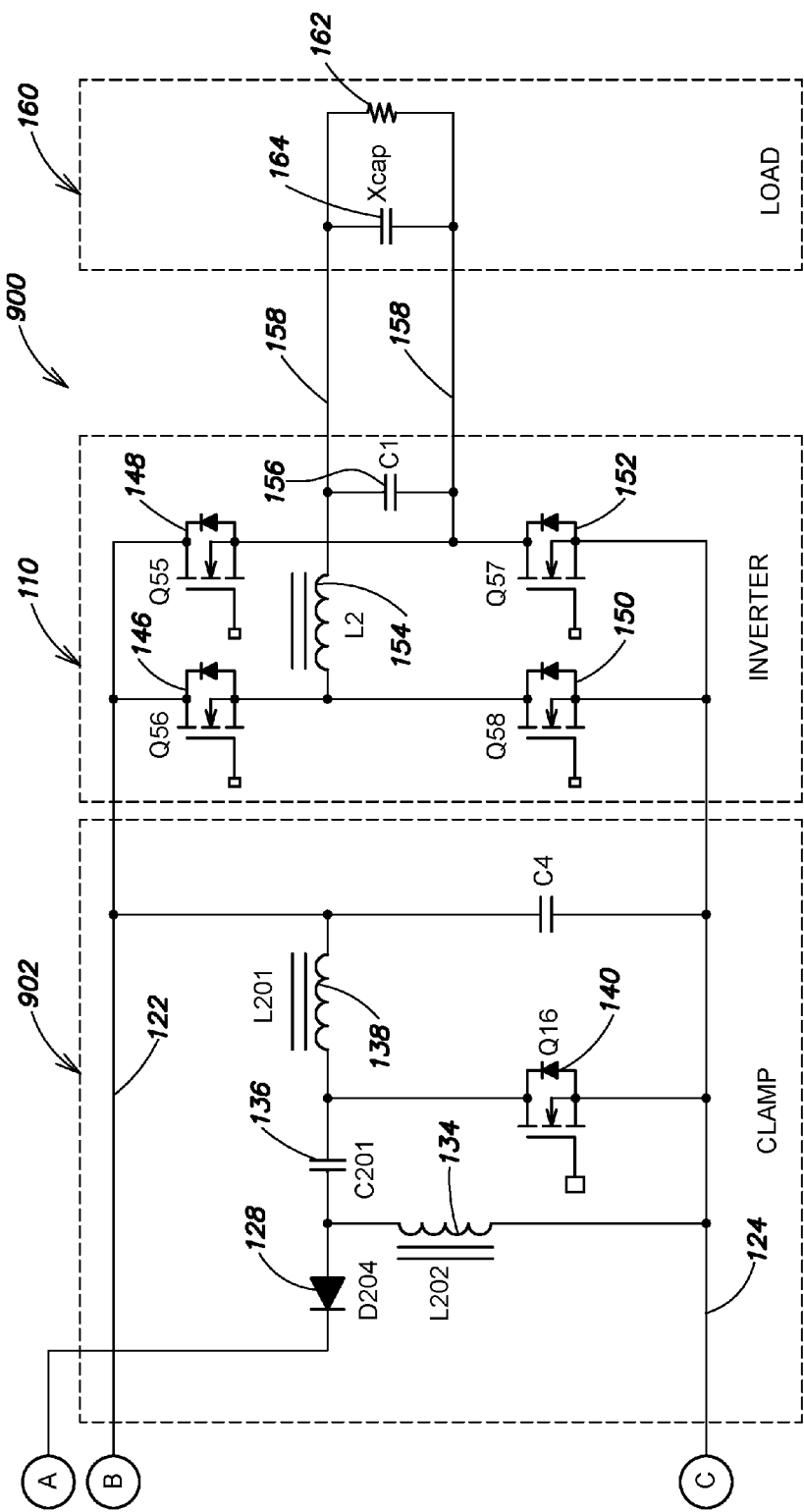

FIGS. 9A and 9B show a circuit diagram of another embodiment of an inverter 900 in accordance with aspects described herein. The inverter 900 is substantially the same as the inverter 100 described above with respect to FIGS. 1A and 1B except that the inverter 900 does not include a clamp capacitor (e.g., such as the clamp capacitor C502 132 shown in FIG. 1B) and the second terminal of the inductor L201 128 is coupled to the load portion 160 via the switches (146, 148, 150, 152) of the inverter portion 110 (rather than via diodes D201 142 and D202 144 as shown in FIG. 1B). The inverter 900 operates substantially the same as the inverter 100 except that rather than transferring energy between a clamp capacitor and the load portion 160 (e.g., as described above with respect to FIGS. 1A and 1B.), the controller 168 operates the clamp circuit 902 to transfer energy directly between the battery 101 and the load portion 160. In addition, rather than receiving energy from the load portion 160 (i.e., from the load capacitance (Xcap) 164) via diodes D201 142 and D202 144, the inverter 900 is configured to receive energy from the load portion 160 via the body diodes of switch Q56 146 and switch Q55 148.

The inverter described above may be more efficient and cost effective than traditional inverters that include a clamp circuit, as the clamp circuit described herein does not include a converter with a transformer. In addition, the clamp circuit described herein includes a relatively short path (with relatively few components) between a clamp energy storage device (e.g., a capacitor or battery) and a load capacitance (Xcap). As such, power losses due to the transfer of energy between the clamp energy storage device (via the clamp circuit) and the load may be reduced. The inverter described herein can also be utilized with any type of UPS (e.g., online, offline, line interactive, etc.) or any other type of power system that utilizes a DC-AC inverter.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention.

Accordingly, the foregoing description and drawings are by way of example only

What is claimed is:

1. A DC-AC inverter comprising:
   an input configured to be coupled to a battery and to receive input DC power from the battery;
   a DC-DC converter portion coupled to the input and configured to receive the input DC power;
   an inverter portion coupled to the DC-DC converter portion;
   an output coupled to the inverter portion and configured to be coupled to a load;
   a clamp circuit coupled to the DC-DC converter portion, the clamp circuit including an energy storage device configured to be coupled to the load via the inverter portion; and
   a controller coupled to the DC-DC converter portion, the clamp circuit, and the inverter portion, and configured to:
      operate, in a first mode of operation, the DC-DC converter portion to convert the input DC power into DC power having a desired voltage level at a first polarity and the inverter portion to provide output power having the desired voltage level at the first polarity to the output;
      operate, in a second mode of operation, the DC-DC converter portion to convert the input DC power into DC power having a desired voltage level at a second polarity and the inverter portion to provide output power having the desired voltage level at the second polarity to the output; and
      operate, in a third mode of operation, the clamp circuit to drive voltage at the output to zero, to receive, via the inverter portion, energy discharged by a load capacitance at the load, and to store the energy discharged by the load capacitance in the energy storage device.

2. The DC-AC inverter of claim 1, further comprising:
   a first bus coupled between the DC-DC converter portion and the inverter portion and configured to provide the DC power having the desired voltage level at the first polarity from the DC-DC converter portion to the inverter portion; and
   a second bus coupled between the DC-DC converter portion and the inverter portion and configured to provide the DC power having the desired voltage level at the second polarity from the DC-DC converter portion to the inverter portion.

3. The DC-AC inverter of claim 2, wherein the energy storage device of the clamp circuit is coupled to the first bus and the second bus, and wherein the controller is further configured to operate, in the first mode of operation, the clamp circuit to discharge, via the first bus and the inverter portion, energy in the energy storage device to the load.

4. The DC-AC inverter of claim 3, wherein the controller is further configured to operate, in the second mode of operation, the clamp circuit to discharge, via the second bus and the inverter portion, energy in the energy storage device to the load.

5. The DC-AC inverter of claim 4, wherein the inverter portion comprises:
   a first switch configured to selectively couple, in the first mode of operation, the first bus to the load; and
   a second switch configured to selectively couple, in the first mode of operation, the second bus to the load.

6. The DC-AC inverter of claim 5, wherein the inverter portion further comprises:
   a third switch configured to selectively couple, in the second mode of operation, the first bus to the load; and
   a fourth switch configured to selectively couple, in the second mode of operation, the second bus to the load.

7. The DC-AC inverter of claim 4, wherein the clamp circuit comprises:

a clamp capacitor coupled between the first bus and the second bus;

a first diode configured to be coupled to the load via the inverter portion;

a second diode configured to be coupled to the load via the inverter portion; and a clamp switch configured to selectively couple the first diode and the second diode to the second bus, wherein, in the third mode of operation, the controller is further configured to operate the clamp switch to close such that energy in the load capacitance discharges to the second bus via the inverter portion and one of the first diode and the second diode.

8. The DC-AC inverter of claim 7, wherein, in the third mode of operation, the controller is further configured to operate the clamp switch to open such that energy in the load capacitance discharges to the clamp capacitor.

9. The DC-AC inverter of claim 8, wherein the controller is further configured to operate, in the first mode of operation, the clamp circuit to discharge, via the first bus and the inverter portion, energy in the clamp capacitor to the load, and wherein the controller is further configured to operate, in the second mode of operation, the clamp circuit to discharge, via the second bus and the inverter portion, energy in the clamp capacitor to the load.

10. The DC-AC inverter of claim 8, wherein the clamp circuit further comprises a capacitor selectively coupled to the second bus via the clamp switch, and wherein, in the third mode of operation, the controller is further configured to operate the clamp switch to close such that energy in the capacitor is discharged to the second bus.

11. The DC-AC inverter of claim 10, wherein the clamp circuit further comprises an inductor coupled to the second bus and to the clamp capacitor, wherein, in the third mode of operation, the controller is further configured to operate the clamp switch to open such that energy in the inductor is discharged to the clamp capacitor.

12. The DC-AC inverter of claim 4, wherein the controller is further configured to operate the DC-AC inverter to transition from the first mode of operation, to the third mode of operation, to the second mode of operation, and back to the first mode of operation such that AC power is provided to the load.

13. The DC-AC inverter of claim 2, wherein the clamp circuit comprises:

a clamp switch configured to selectively couple the first bus to the second bus, wherein, in the third mode of operation, the controller is further configured to operate the clamp switch to close such that energy in the load capacitance discharges to the second bus via the first bus and the inverter portion.

14. The DC-AC inverter of claim 13, wherein the inverter portion comprises at least one switch configured to be coupled between the load and the first bus, the at least one switch including a body diode configured to be coupled between the first bus and the load, and wherein, in the third mode of operation, the controller is further configured to operate the clamp switch to close such that energy in the load capacitance discharges to the second bus via the body diode of the at least one switch and the first bus.

15. The DC-AC inverter of claim 14, wherein, in the third mode of operation, the controller is further configured to operate the clamp switch to open such that energy in the load capacitance discharges to the battery.

16. A method for operating a DC-AC inverter comprising an input, a DC-DC converter portion coupled to the input, an inverter portion coupled to the DC-DC converter portion, an output configured to be coupled to a load, and clamp circuit including an energy storage device configured to be coupled to the load via the inverter portion, the method comprising:

receiving, by the DC-DC converter portion via the input, input DC power;

converting, in a first mode of operation, the input DC power into DC power having a desired voltage level at a first polarity;

providing, in the first mode of operation with the inverter portion, output power having the desired voltage level at the first polarity to the output;

converting, in a second mode of operation, the input DC power into DC power having a desired voltage level at a second polarity;

providing, in the second mode of operation with the inverter portion, output power having the desired voltage level at the second polarity to the output;

driving, in a third mode of operation with the clamp circuit, voltage at the output to zero;

receiving, in the third mode of operation by the clamp circuit, energy discharged by a load capacitance at the load via the inverter portion; and storing, in the energy storage device of the clamp circuit, the energy discharged by the load capacitance.

17. The method of claim 16, further comprising discharging, in the first mode of operation, the energy storage device to the load, via a first bus and the inverter portion.

18. The method of claim 17, further comprising discharging, in the second mode of operation, the energy storage device to the load, via a second bus and the inverter portion.

19. The method of claim 18, further comprising alternating operation of the DC-AC converter between the first mode of operation, the second mode of operation, and the third mode of operation such that AC power is provided to the output.

20. A DC-AC inverter comprising:

an input configured to be coupled to a battery and to receive input DC power from the battery;

a DC-DC converter portion coupled to the input and configured to receive the input DC power;

an inverter portion coupled to the DC-DC converter portion;

an output coupled to the inverter portion and configured to be coupled to a load;

a controller coupled to the DC-DC converter portion, the clamp circuit, and the inverter portion, and configured to:

operate, in a first mode of operation, the DC-DC converter portion to convert the input DC power into DC power having a desired voltage level at a first polarity and the inverter portion to provide output power having the desired voltage level at the first polarity to the output; and operate, in a second mode of operation, the DC-DC converter portion to convert the input DC power into DC power having a desired voltage level at a second polarity and the inverter portion to provide output power having the desired voltage level at the second polarity to the output; and means for clamping, in a third mode of operation, voltage at the output to zero and for transferring, in the first, second, and third modes of operation, energy between the load and an energy storage device via at least one path absent a transformer.

\* \* \* \* \*